April 27, 1937.  J. Y. BLAZEK ET AL  2,078,598
CLAMPING MEANS
Filed Nov. 5, 1934  2 Sheets-Sheet 1
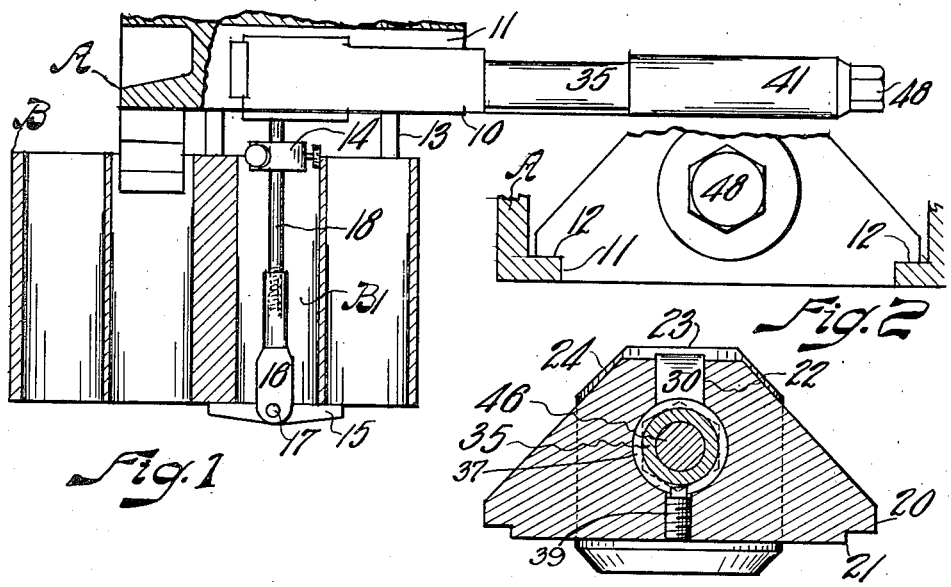
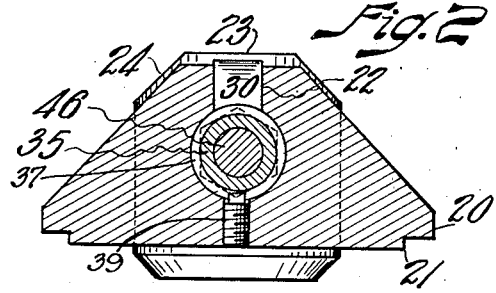
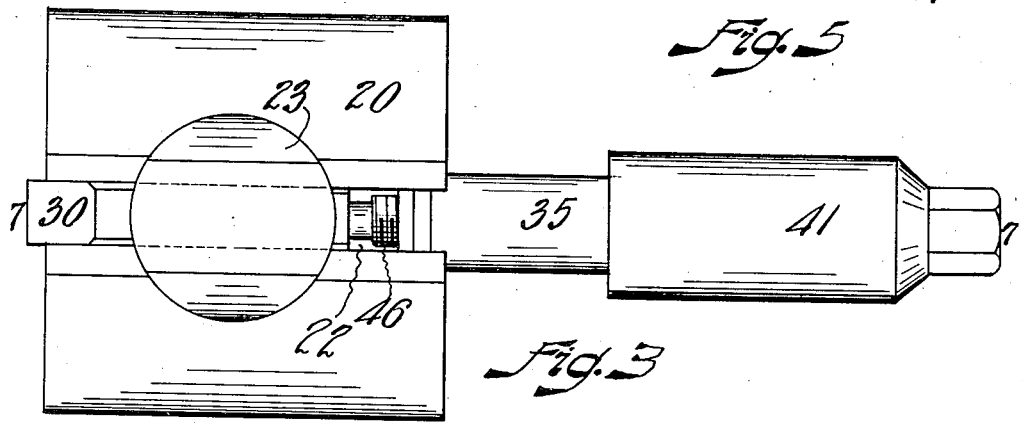
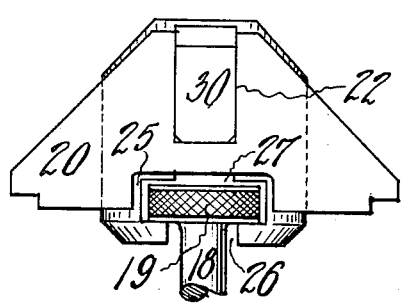
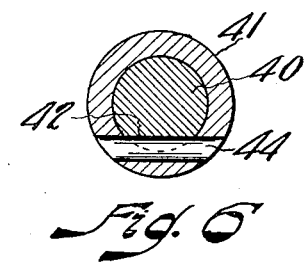
INVENTORS
J. Y. Blazek
R. J. Kuschel
By C. T. Heinke ATTORNEY April 27, 1937. J. Y. BLAZEK ET AL 2,078,598
CLAMPING MEANS
Filed Nov. 5, 1934 2 Sheets-Sheet 2
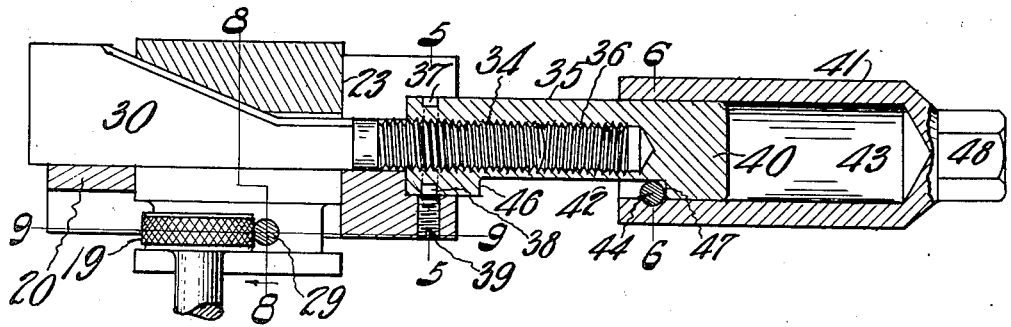
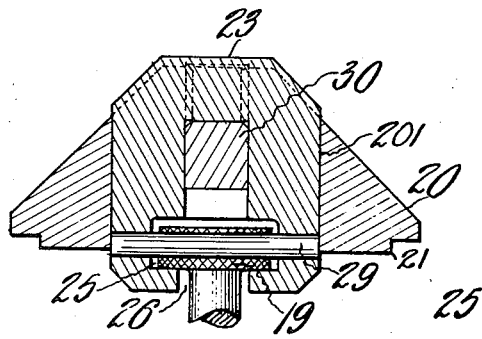
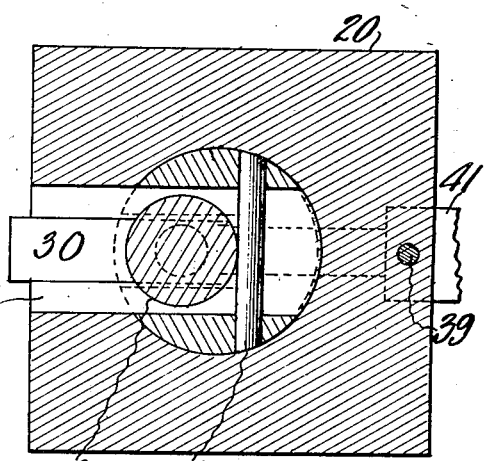
INVENTORS
J. Y. Blazek
R. J. Kuschel
By C. F. Heinkel ATTORNEY Patented Apr. 27, 1937

2,078,598

UNITED STATES PATENT OFFICE 2,078,598

CLAMPING MEANS

John Y. Blazek, Maple Heights, and Richard J. Kuschel, Cleveland, Ohio, assignors to Lempco Products, Inc., Bedford, Ohio Application November 5, 1934, Serial No. 751,562

2 Claims. (Cl. 77—2)

The present invention relates to releasably clamping elements together.

Objects of the present invention are:

To provide a clamping means which effectively and efficiently clamps adjacent elements together and to construct the same in the most economical manner.

To make such a device individually removable and disengageable from adjacent elements for such removal.

To provide for quick and easy attachment of a clamping device to and between adjacent elements for clamping together thereof and quick and easy detachment from the elements after the clamping is released.

To eliminate dead centers in clamping means so that vibrations in the elements, or brought about therein, do not affect or loosen the clamping.

To provide for operating a clamping device from the outside of clamped together elements so that neither of the elements needs to be disturbed for clamping together thereof nor for releasing the clamping thereof and to permit of contraction of the clamp operating means into the device for convenience in operating and handling and transportation thereof.

Other objects will be pointed out during the description of the device shown in the accompanying drawings, or will become obvious or apparent, or will suggest themselves upon an inspection of this specification and the accompanying drawings forming part thereof.

In many instances, such as is shown in the accompanying drawings, representing a cylinder to be rebored and a cylinder reboring means or device clamped thereon, it is quite necessary that the device be clamped effectively and tightly on the cylinder and that it remain so clamped while the reboring is going on.

It is well known in the art that reboring or other tool action on work produces vibrations either in the boring means or in the element being bored or in both. These vibrations are transmitted to the clamping means which hold the elements together and are quite apt to release the clamping and cause shifting of the boring device on the cylinder and consequent shifting of the boring means relative to the cylinder and thereby destroy the correctness of the bore being made. This, of course, is intolerable since cylinders must be bored straight and correct as is well known.

A cylinder boring device must be lifted onto the end of the cylinder to be rebored and this entails difficulties due to the weight of the boring device in the prior art. The present invention overcomes at least part of these difficulties by providing an individual clamping device which is individually insertable in between the cylinder and the boring device and individually removable therefrom without affecting either the cylinder or the boring device. By this means, at least the weight of the clamping device can be taken from the boring device while the same is being transported from place to place or is put onto or is removed from the cylinder.

A cylinder reboring device, or a device of similar action or of similar import, must be located accurately and must remain so accurately located while boring or the like is going on. In clamping devices of the prior art, either one or both of the clamped together members is affected by the clamping thereof and may easily cause shifting of one or the other or both of the elements by having the clamping operating means connected with or in contact on one or the other or both of the elements and cause shifting thereof during the clamping. The present invention locates the clamp operating means outside of the clamping members of the clamping device so that the clamping members need not be touched for operating of the clamp and the clamp operating part of the clamping device is quite remote from the clamping device and is also located on the outside of the elements which are to be clamped together so that operation of the clamp does not affect the clamping members, at least not detrimentally.

Eccentrics and cams, rotatable about an axis or pivotable about an axis, have been used in the prior art. These means, however must be accurately made and can clamp and retain the clamping only when a dead center condition is attained therein. A dead center condition is easily destroyed even by vibrations in the clamping members or in the clamped together elements and thereby release the clamping at a time when it should be most effective. The wedge of the present invention has no dead centers and needs none and is released only when it is manually operated.

The accompanying drawings show, illustrative of the present invention, and forming part of this specification, a certain clamping device as designed for and applied to a cylinder reboring device clamped onto a cylinder to be rebored. However, this showing is not to be understood as being a limitation for the present invention. In the accompanying drawings:

Fig. 1 is a section of a cylinder to be rebored, the lower part of a reboring device partly in section on the top thereof and a clamping means of the present invention holding the reboring device clamped onto the cylinder.

Fig. 2 is a fragmental end view of Fig. 1 and shows the slot therein and the present clamping means therein.

Fig. 3 is a plan view of the clamping mechanism as individually insettable and individually removable from the reboring device.

Fig. 4 is an end view of the device shown in Fig. 3.

Fig. 5 is a transverse section taken on line 5—5 of Fig. 7 and shows more clearly the transverse relation of the threaded part of the wedge as related to the nut and the latter related to the clamping block.

Fig. 6 is a transverse section taken on line 6—6 of Fig. 7 and shows more clearly the transverse relation between the wedge moving nut and the extensible sleeve thereon.

Fig. 7 is a longitudinal section of the clamping unit, the section being taken on the line 7—7 of Fig. 3.

Fig. 8 is a transverse section taken on line 8—8 of Fig. 7 and shows more clearly the relation of the wedge and plunger and stop pin for the connecting rod.

Fig. 9 is a fragmental section, taken on line 9—9 of Fig. 7 and shows more clearly the relation of the head on the connecting rod to the plunger and the stop pin.

Similar reference characters refer to similar parts throughout the views.

The present invention is herein below described with particular reference to the mechanism shown in the accompanying drawings. Changes and modifications, within the scope of the present invention and the appended claims, are thought to be made quite obvious by this description.

A represents the lower part of a cylinder reboring device clamped onto the top of the cylinder B by means of the clamping device of the present invention.

The wear plate 10 may be secured to the bottom of the boring device if desired and may be hardened if desired so that repeated attachment of the boring device to the cylinder and removal therefrom will not wear the bottom of the boring device to cause incorrect seating thereof on the cylinder.

The slot 11 extends through the rear part of the device and is open at the rear end so that the below described clamping device can be inserted therein endwise and removed therefrom endwise. This slot has the abutment faces 12, 12 facing inwardly of the boring device for abutment thereon of the bottom of the below described clamping device.

A stool means 13 may be provided to raise the bottom of the device above the top of the cylinder for access to the locating element 14.

The clamping member 15 is adapted to be contacted on the bottom of the cylinder as shown and to be removed therefrom. The cleat 16 forms a part of the connecting rod and is pivoted onto the clamping member by means of the pin 17 so that the latter can adjust itself according to the bottom of the cylinder when clamping is affected. The stem 18, also a part of the connecting rod, is threaded into the cleat to afford an axial adjusting means so that the clamping member can be adjusted for different lengths of cylinders. The above mentioned locating element 14 is secured to the stem 18 to either rotate therewith or thereon and is used to locate the reboring device on the cylinder. The head 19 is fixed on the upper end of the stem.

The clamping block 20 has the bottom 21 thereof formed to suit the bottom of the slot 11, has the sides thereof beveled to reduce weight of the block and to reduce space required for the block and has the bore 201 vertically therethrough and the slot 22 axially therethrough and traversing the bore 201.

The plunger 23 is axially slidable in the bore 201 and has the sides 24 beveled to reduce weight and space required. The slot 25 extends transversely through the lower part of the plunger and is wider than the diameter of the head 19 and deeper than the height of the head and the part 26 thereof is wider than the diameter of the stem 18 so that the head 19 and the upper end of the stem can slide freely in the slot and have sideplay therein. The slot 27 extends transversely through the plunger, has the upper end thereof closed, and the upper wall 28 beveled to suit the below described wedge as is shown in Fig. 6. The stop pin 29 is fixed in the plunger and traverses the slot 25 and is located to abut the head 19 to limit the insertion of the clamping means as a whole relative to the connecting rod.

The wedge 30 extends through the plunger and through the slot 22. The bottom edge 31 of the wedge is shown as being parallel with the longitudinal axis thereof although it may be made bevel or inclined similar to the opposite edge 32 or of more or less inclination than the edge 32 as occasion or necessity or desire may demand. The edge 31 rides on the bottom 33 of the slot 22 when the wedge is operated axially and the bevel edge 32 is adapted to contact the bevel or inclined top wall 28 of the slot 27. The shank 34 is part of the wedge, extends axially thereof, and is externally threaded but the thread is not in threaded engagement with the block 20 and is loosely in the slot 22.

The elongated nut 35 has the internal thread 36 in one end thereof to engage with the external thread on the shank 34. The groove 37 is provided in the circular surface of the inner end of the nut and the pilot 38 of the screw 39, which is threaded into the block 20, extends into the groove 37 to permit rotation of the nut and to hold the same against axial movement relative to the block. The outer end 40 of the nut extends into the operating sleeve 41 and the groove 42 is provided on and extends axially of the nut across the middle part thereof as shown.

The sleeve 41 has the bore 43 axially in one end thereof so that the sleeve can slide or telescope over the outer end of the nut. The pin 44 is driven into the sleeve near one end thereof and traverses the bore 43 at one side thereof and also traverses the groove 42. The end walls 46 and 47 of the groove are adapted to contact the pin 44 for limitation of axial movement of the sleeve relative to the nut and to the block and to the device as a whole. The hexagonal part 48 is provided on the outer end of the sleeve to form a take hold means for a wrench when desired. An equivalent take hold means may be formed on the body of the sleeve so that the part 48 is not necessary and may be eliminated to shorten the clamping device as a whole. Knurling of the circular surface of the sleeve will answer the purpose in many instances.

In operation:

The reboring device, without the clamping device therein to reduce weight to be lifted, is first transported to the cylinder and, if desired, the stool 13 may be placed between the cylinder and the reboring device.

The upper part of the clamping device is then inserted endwise into the reboring device through the slot 11 and moved inwardly of the reboring device until the pin 29 abuts the head 19. The connecting rod 18 with the clamping member 15 thereon being first installed in at least approximate position in the cylinder B1 as seen in Fig. 1 and located therein by the locating element 14. The locating element being held upwardly so that the head 19 finds the slot 27. The sleeve 41 then, if it had been telescoped over the nut 35 to shorten the over all length of the clamping device and to locate the sleeve to within the reboring device, is pulled outwardly so that the same may be taken hold of conveniently. The sleeve is then rotated, by means of a wrench if necessary, which causes the wedge 30 to be moved axially through the threaded engagement of the nut with the threaded shank on the wedge. This axial movement of the wedge, the lower edge 31 of which rides on the bottom wall 33 of the slot 22 in the clamping block 20, causes the bevel edge 32 of the wedge to contact and engage with the beveled upper wall 28 and thereby moves the plunger upwardly and also the connecting rod and the clamping member 15 connected therewith. Due to the beveled edge of the wedge contacting with the bevel wall of the slot in the plunger and the straight edge of the wedge contacting with the bottom wall of the slot in the clamping block and the axial movement of the wedge caused by rotation of the sleeve, the clamping member 15 is moved toward and against the lower end of the cylinder and the clamping block is moved downwardly toward and against the upper end of the cylinder and the lower face of the clamping block contacting with the lower or abutment faces 12 of the framing of the reboring device, the clamping device is moved downwardly toward and against the cylinder. The clamping device is thus clamped onto the cylinder block and this may be made as tight as desired by appropriate rotation of the sleeve 41 facilitated by the polygonal part thereof for application of a wrench or the like. A reverse rotation of the sleeve releases the clamping and permits of easy and convenient removal of the reboring device from the cylinder.

The device shown and described is easy and convenient and quick of installation and removal and of transportation, is effective in clamping, is not easily affected by vibrations caused in the device by the reboring thereby, and the sleeve can be moved into the device for ease and convenience in transportation of the device and to reduce vibrations in the nut which may be produced by vibrations in the device and the long overhang of the sleeve if it were extended.

Having described the present invention in one form and in one application thereof and without limiting the same to the one application and form so shown and described since the same can be used in other applications and in other forms or modifications within the scope and intent of the present invention and within the scope of the appended claims.

We claim:

1. A work clamping means having a movable clamping member to engage a work piece, a movable clamp operating rod having one end thereof connected with said clamping member and having a head on the other end thereof, and an operating mechanism for moving said rod and said clamping member including a plunger axially movable in a clamping member and being in said head, a longitudinally movable wedge extending transversely through said plunger and through said head and adapted to move the same relatively and having a threaded shank, a nut threaded onto said shank and held against longitudinal movement to move said wedge in either direction upon a corresponding rotative movement of the nut, and an extension sleeve telescoped over a part of said nut and having means to rotate the same and to lengthen and shorten said nut and to retain the sleeve on said nut.

2. A reboring device for a cylinder to be rebored, and a clamping means to hold and release said device onto and from one end of the cylinder having a movable clamping block engagable with said device and a movable clamping member adapted for contact on the other end of the cylinder, a connecting rod having one end thereof connected with said clamping member and having a head on the other end thereof, a plunger axially movable in said clamping block and connected with said head, a longitudinally movable wedge extending through said plunger and contacting said block and said plunger to move the same for clamping upon longitudinal movement of said wedge, and a moving means for said wedge having a part extensible to the outside of said device for convenience of operating said wedge and distendible into the device to prevent injury thereto during transportation and accidental loosening of the clamping.

JOHN Y. BLAZEK.
RICHARD J. KUSCHEL.